United States Patent Office 3,246,011
Patented Apr. 12, 1966

3,246,011
ORGANIC POLYISOCYANATES
Erwin Müller and Hugo Wilms, Leverkusen, Helmuth Kritzler, Cologne-Flittard, and Kuno Wagner, Leverkusen, Germany, assignors to Farbenfabriken Bayer Aktiengesellschaft, Leverkusen, Germany, a corporation of Germany
No Drawing. Filed July 25, 1961, Ser. No. 126,506
Claims priority, application Germany, Aug. 12, 1960, F 31,870
7 Claims. (Cl. 260—340.7)

This invention relates generally to organic polyisocyanates and more particularly to a novel organic diisocyanate and to a method for making the same.

Conventional organic diisocyanates such as, toluylene diisocyanate, p,p'-diphenylmethane diisocyanate and the like are prepared by phosgenation of the corresponding diamine is a suitable inert organic solvent for the resulting diisocyanate. Ordinarily, diamines containing labile groupings can not be used because such compounds split under the action of hydrochloric acid or phosgene and the desired diisocyanate is not produced. It has been disclosed, for example, in "Annalen," 562, 75 (1949) that amines containing ether groups are wholly or partially split under phosgenation conditions and that isocyanates containing chlorine are produced. It known that acetals are even less resistant to the action of acids than ethers and that acetals split very easily when subjected to acids. When conventional diamines containing acetal groups are subjected to phosgenation even at temperatures below 100° C. splitting occurs. For example, a compound having the formula (1)

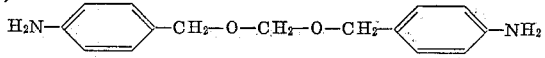

produces 4-isocyanatobenzyl chloride when phosgenated. The heretofore available organic diisocyanates have also been free from reactive hydrogen atoms determinable by the Zerewitinoff method because such hydrogen atoms react with the —NCO groups of the isocyanate.

It is an object of this invention to provide a novel organic diisocyanate. Another object of the invention is to provide an isocyanate containing acetal groups. Still another object of the invention is to provide a method for making organic diisocyanates containing acetal groups. A still further object of the invention is to provide an organic diisocyanate containing hydrogen atoms determinable by the Zerewitinoff method.

The foregoing objects and others are accomplished, generally speaking, in accordance with this invention by providing an organic diisocyanate having the formula (2)

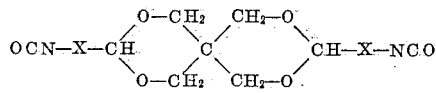

wherein X is either an arylene or alkylene radical. It has been found that an organic diisocyanate containing acetal groups can be prepared provided that an organic diamine having the formula (3)

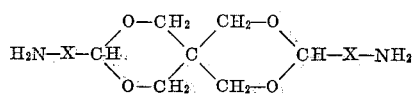

wherein X is either an arylene or alkylene radical is phosgenated while suspended in an inert organic solvent for the resulting diisocyanate. It is essential that the temperature during the phosgenation be less than about 130° C. in order to avoid splitting of the acetal groups in the diamine. The invention thus provides a stable organic diisocyanate containing hydrogen atoms determinable by the Zerewitinoff method. The organic diamine used in preparing the novel organic diisocyanate can be prepared in several ways. A very convenient method is reacting an aldehyde containing nitro groups with pentaerythritol and subsequently hydrogenating the resulting nitro compound.

It is surprising that the action of phosgene on a diamine containing cyclic acetal groupings does not result in the splitting of the acetal groupings even when the temperature is up to as high as about 130° C. It has been discovered in accordance with this invention that the cyclic acetal groupings are more stable under acidic conditions and more resistant to phosgenation conditions than the acetal groupings of linear acetals. In fact, the acetal groupings are more resistant to phosgenation conditions than ether groupings. The course of the reaction which produces the new diisocyanates is, therefore, quite unexpected in view of the results obtained when a linear acetal having amino groups is phosgenated.

Any suitable aldehyde containing nitro groups can be reacted with pentaerythritol to produce an organic compound containing nitro groups which can later be hydrogenated to produce a suitable organic diamine. The nitrobutyric aldehydes such as, nitroisobutyric aldehyde, nitrovaleric aldehyde, nitroisovaleric aldehyde; the various benzaldehydes such as, 3-nitrobenzaldehyde and 5-nitrobenzaldehyde, the nitro naphthoic aldehydes including 3-nitro naphthoic aldehyde and the like are examples of aldehydes which can be reacted with pentaerythritol to form a nitro compound which can be reduced by hydrogenation to form a diamine. Halogen-substituted nitro aldehydes such as for example, 2-chloro 3-nitrobenzaldehyde, 2-bromo 3-nitrobenzaldehyde can also be used.

Diamines suitable for use in the process of this invention can also be obtained by reacting an aldehyde such as isobutyrylaldehyde with pentaerythritol and reacting the resulting product with acrylonitrile to form dinitrile which is later hydrogenated to form the diamine.

Still another method for making the diamine consists in reacting a chloroaldehyde such as chloroacetaldehyde with pentaerythritol and subsequent interchange of the chlorine with ammonia.

Any suitable inert organic solvent for the resulting diisocyanate can be used in the phosgenation of the diamine. Examples of suitable solvents include chlorobenzene, o-dichlorobenzene, 1,3,5-trichlorobenzene, dimethylsulfone, xylene, toluene, benzene and the like. In a preferred embodiment of the invention, the diamine is introduced at low temperatures into a previously prepared solution of phosgene in one of the foregoing solvents and the resulting mixture is then heated while phosgene is continuously introduced into the solution. If desired, a hydrochloride of a diamine can be used instead of the diamine. The diamine hydrochloride is suspended in the inert organic solvent just like the diamine. The temperature is maintained at from about 50° C. to about 130° C. while the phosgene is introduced. The solution gradually becomes clear as the phosgene is added indicating that an isocyanate is formed. Hydrochloric acid is split off during the reaction. The isocyanate can be separated from the solution by distillation or other suitable means.

As pointed out hereinbefore, the organic diisocyanate provided by this invention contains two hydrogen atoms determinable by the Zerewitinoff method and reactive with —NCO groups. The heretofore organic diisocyanates were unstable if a reactive hydrogen atom was present. The novel organic diisocyanates provided by this invention can be used for making cellular polyurethanes, polyurethane coatings, polyurethane elastomers and adhesives. Because of their reactive hydrogen atoms, the new diisocyanates are especially adopted for preparing peroxide-cured elastomers, they are highly useful as adhesives since they form hydrogen bridges. Polyurethane foams are used in making upholstery, in automobile crash pads and the like, while polyurethane elastomers are used to make shoe lifts and various mechanical parts for machines.

Example 1

About 300 grams of a diamine obtained from about 371 grams of 2-chloro 6-nitrobenzaldehyde and about 136 grams of pentaerythritol in about 1 liter of toluene with addition of about 2 grams of p-toluene sulphonic acid by azeotropic condensation with subsequent catalytic hydrogenation are introduced at a temperature of about $-5°$ C. and while stirring into a solution consisting of about 3 liters of chlorobenzene and about 600 grams of phosgene. The mixture is left standing overnight and is gradually heated while stirring and introducing phosgene to about 130° C. A clear solution is formed after about two or three hours. As soon as the evolution of HCl has terminated, the excess phosgene is driven off with dry air, and the substance is clarified with carbon and filtered. On cooling, the diisocyanate crystallizes out of the slightly yellowish solution.

Yield about 235 grams, melting point about 240° C. to about 242° C., —NCO content about 17.9%.

Example 2

About 300 grams of a diamine obtained from about 371 grams of 2-chloro 5-nitrobenzaldehyde and about 136 grams of pentaerythritol in about 1 liter of toluene with addition of about 2 grams of p-toluene sulphonic acid by azeotropic condensation with subsequent catalytic hydrogenation are introduced at a temperature of about $-5°$ C. and while stirring into a solution consisting of about 3 liters of chlorobenzene and about 600 grams of phosgene. The mixture is left standing overnight and is gradually heated while stirring and introducing phosgene to about 130° C. A clear solution is formed after about two to three hours. As soon as the evolution of HCl has terminated, the excess phosgene is driven off with dry air, and the substance is clarified with carbon and filtered. On cooling, the diisocyanate crystallizes out of the slightly yellowish solution. A diisocyanate is obtained which has a melting point of about 141° C., an —NCO content of about 18.2%. Methyl urethane: melting point 208° C. to 210° C.

Example 3

About 300 grams of a diamine (melting point 175–177° C.) obtained from about 302 grams of 3-nitrobenzaldehyde and about 136 grams of pentaerythritol in about 1 liter of toluene with addition of about 2 grams of p-toluene sulphonic acid by azeotropic condensation followed by hydrogenation are treated with phosgene under the conditions indicated in Example 1. After the reaction has terminated, and after clarifying the solution with carbon, the solution is concentrated by evaporation in vacuo and a yellowish viscous oil is obtained, which crystallizes after several hours.

Yield about 346 grams, an —NCO content of about 19.8%.

Example 4

284 grams of chlorine are introduced at 12° C. into a solution of 176 grams of freshly distilled acetaldehyde, 240 cm.³ of water and 1000 cm.³ of hydrochloric acid (D=1,160). 272 grams of pentaerythritol are added and the mixture is heated to 60–70° C. for about two hours. Colourless crystals are separated which are sucked off by filtration and dried. (Yield 425 grams, melting point 92–93° C.).

257 grams of the 3,9-bis-(chloro methyl)-spiro-bis(m-dioxan) thus obtained are mixed with 1250 cm.³ of liquid ammonia and put for 3 hours into an autoclave at room temperature. The autoclave is then kept at 115° C. for 7 hours. After cooling to 40° C. 600 cm.³ of ethanol are pumped into the autoclave which is left standing for another hour. Residual ammonia is removed and the amine separated by adding a solution of 112 grams of potassium hydroxide in 450 cm.³ of ethanol. Separated potassium chloride is filtered off and the solvent is distilled off. The residue boils at 153–158° C./O. 12 mm. The colourless distillate solidifies and melts at 64–67° C. 119 grams of the diamine are obtained.

300 grams of 3,9-bis-(amino methyl)-spiro-bis-(m-dioxan) dissolved in 700 cm.³ of chloro benzene are added to a solution of 1200 grams of phosgene in 1800 cm.³ of chloro benzene. The mixture is left standing overnight and then slowly heated while stirring and introducing phosgene to 130° C. After two hours of heating a clear solution is obtained. As soon as the evolution of HCl has terminated the excess phosgene is driven off with dry nitrogen and the substance is clarified with carbon and filtered. The solvent is removed in vacuo and the residue subjected to a higher vacuum distillation. The diisocyanate boils at 176–180° C./O. 2 mm. and solidifies on cooling to a colourless crystallising mass.

| | |
|---|---|
| Yield _____grams__ | 286 |
| NCO content _____percent__ | 29.5 |
| Melting point _____° C.__ | 89–90 |

It is to be understood that various other nitro compounds indicated as suitable herein can be substituted for those in the foregoing examples. It is preferred to use an excess of phosgene over the stoichiometric requirements. Best results are obtained if from about 1½ to about 3 times the stoichiometric requirements of phosgene are used.

As indicated hereinbefore, X in Formulae 2 and 3 above can be arylene, alkylene, substituted alkylene or substituted arylene. The substituent on the alkylene or arylene radical can be any substituent which will not interfere with the reactions which result in the formation of the diisocyanate. Additional —NO₂ or —NH₂ groups will result in a polyisocyanate having more than two —NCO groups. Examples of contemplated substituents include halogen, alkoxy, alkyl, aralkyl and the like. For example, if X is arylene it can be bromo or chloro substituted, methoxy, methyl, butoxy, ethoxy substituted. If X is an alkylene radical, it is preferred that it contains from 1 to 5 carbon atoms.

Although the invention has been described in considerable detail, it is to be understood that such detail is solely for the purpose of illustration and that the invention is not limited thereto except as is set forth in the claims.

What is claimed is:

1. An organic diisocyanate having the formula:

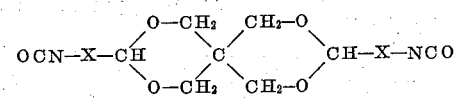

wherein X is a member selected from the group consisting of alkylene of from four to five carbon atoms, phenylene, halogenated phenylene and naphthylene.

2. The compound of claim 1 wherein X is a halogenated phenylene.

3. A method for preparing an organic diisocyanate containing reactive hydrogen which comprises reacting a nitro substituted aldehyde with pentaerythritol, hydrogenating the resulting product to form a diamine and reacting the diamine with phosgene.

4. In the preparation of an organic diisocyanate by phosgenating a diamine, the method which provides a stable acetal which comprises reacting a nitro substituted aldehyde with pentaerythritol, hydrogenating the resulting nitro compound to form a diamine, and subjecting the diamine to phosgene in a suitable inert organic solvent for the resulting diisocyanate until the diisocyanate is formed.

5. A compound having the formula:

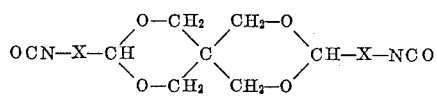

wherein X is alkylene of four carbon atoms.

6. A compound having the formula:

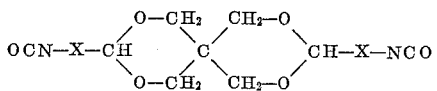

wherein X is alkylene of five carbon atoms.

7. A compound having the formula:

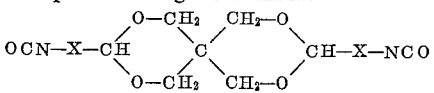

wherein X is naphthylene.

References Cited by the Examiner

UNITED STATES PATENTS 2,908,703  10/1959  Latourette et al. _____ 260—453
2,945,008  7/1960  Caldwell et al. ____ 260—340.7

OTHER REFERENCES

Boeseken et al.: "Ber.," vol. 62, pages 1310–1312 (1929).

NICHOLAS S. RIZZO, *Primary Examiner.*

IRVING MARCUS, WALTER A. MODANCE,
*Examiners.*